United States Patent [19]

Johnson

[11] 4,258,829
[45] Mar. 31, 1981

[54] ELEVATOR SYSTEM

[75] Inventor: Frederick O. Johnson, Monroeville, Pa.

[73] Assignee: Westinghouse Electric Corp., Pittsburgh, Pa.

[21] Appl. No.: 61,538

[22] Filed: Jul. 27, 1979

[51] Int. Cl.³ .............................................. B66B 1/30
[52] U.S. Cl. ................................................ 187/29 R
[58] Field of Search .......................................... 187/29

[56] References Cited

U.S. PATENT DOCUMENTS 3,860,093  1/1975  Mitsui et al. ............................ 187/29
3,891,064  6/1975  Clark ...................................... 187/29

Primary Examiner—J. V. Truhe
Assistant Examiner—W. E. Duncanson, Jr.
Attorney, Agent, or Firm—D. R. Lackey

[57] ABSTRACT

An elevator system having an elevator car operable in the up and down travel directions in a selected one of first and second speed modes. The elevator system develops a bi-directional speed pattern signal from a selected one of first and second unidirectional speed pattern input signals, with the polarity of the bi-directional speed pattern signal being responsive to the selected travel direction.

8 Claims, 4 Drawing Figures

ELEVATOR SYSTEM

BACKGROUND OF THE INVENTION

1. Field of the Invention

The invention relates in general to elevator systems, and more specifically to speed pattern processing apparatus for elevator systems.

2. Description of the Prior Art

Elevator systems of the traction type conventionally control the travel and speed of an elevator car via an error signal responsive to the difference between the desired speed and the actual speed. The desired speed is provided by a speed pattern generator which generates a speed pattern signal for comparison with a signal responsive to actual speed, such as a signal from a tachogenerator linked to the elevator drive machine. The speed pattern signal is a bi-directional signal, with one polarity requesting travel in one travel direction, and the other polarity requesting travel in the opposite travel direction.

In addition to the normal speed mode, a maintenance speed mode, in which the elevator car is operable by maintenance personnel from the top of the elevator car, is also provided. The maintenance speed mode provides a maximum car speed of up to 150 feet per minute for inspection, maintenance and repair purposes. The speed pattern for the maintenance mode must also be bi-directional, in order to permit travel in both travel directions.

SUMMARY OF THE INVENTION

Briefly, the present invention is a new and improved elevator system which logically combines logic signals responsive to start, travel direction and speed mode commands, to provide a bi-directional speed pattern signal in response to a selected one of first and second unidirectional speed pattern signals. The first unidirectional speed pattern signal may be generated by a conventional speed pattern generator for directing the elevator car in the normal speed mode. The second unidirectional speed pattern signal, in a preferred embodiment of the invention, is generated in response to a change in the logic level of a start signal, each time the start mode goes true, if a valid travel direction request has been made, notwithstanding selection of the first unidirectional speed pattern signal by the speed mode command.

The logical combination of the logic signals is arranged such that should both travel directions be simultaneously selected at any time, the second bi-directional speed pattern signal will be selected, and if is not already zero, it will be reduced smoothly and exponentially to zero magnitude. Also, once a specific travel direction has been selected, the direction selection is latched for the duration of the run, and is not altered by a loss of the original travel direction signal. Further, if no direction selection exists when the start signal goes true, the maintenance speed pattern will be selected, and it will be maintained at zero.

BRIEF DESCRIPTION OF THE DRAWINGS

The invention may be better understood, and further advantages and uses therefore more readily apparent, when considered in view of the following detailed description of exemplary embodiments, taken with the accompanying drawings in which.

DESCRIPTION OF PREFERRED EMBODIMENTS

Figure 1:
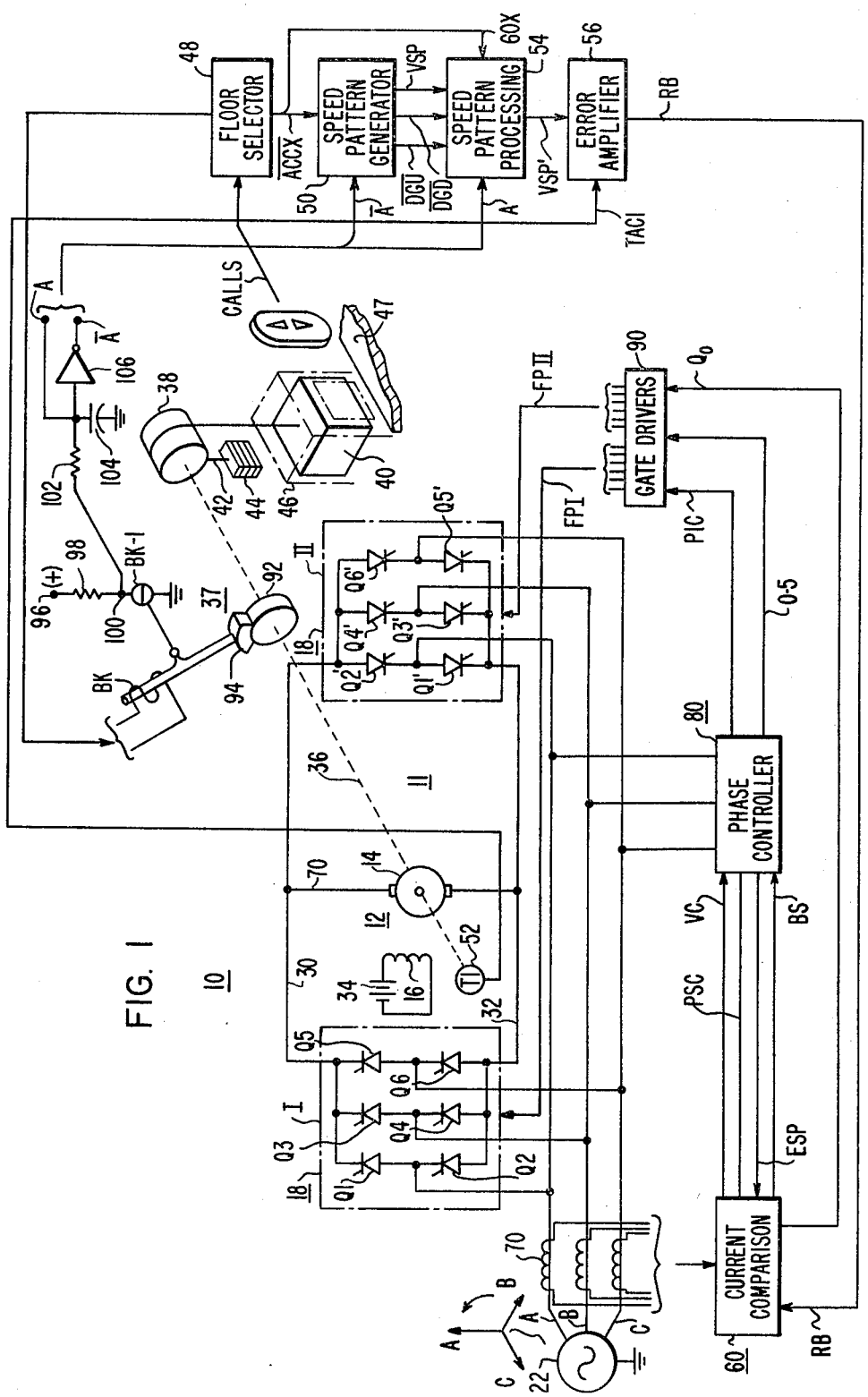
FIG. 1 is a partially schematic and partially block diagram of an elevator system of the type which may utilize the teachings of the invention.

Referring now to the drawings, and to FIG. 1 in particular, there is shown an elevator system 10 of the traction type constructed according to the teachings of the invention. Elevator system 10 includes a traction drive machine 11 which, as illustrated, includes a drive motor 12, such as a direct current drive motor having an armature 14 and a field winding 16. The armature 14 is electrically connected to an adjustable source of direct current potential. The source of potential may be a dual converter 18, as illustrated, or a motor-generator set, as desired. The invention is also applicable to speed controlled elevator systems which utilize an A.C. induction drive motor.

In the embodiment of the invention set forth in FIG. 1 for purposes of example, the dual converter 18 includes first and second converter banks I and II, respectively, which may be three-phase, full-wave bridge rectifiers connected in parallel opposition. Each converter includes a plurality of static controlled rectifier devices connected to interchange electrical power between alternating and direct current circuits. The alternating current circuit includes a source 22 of alternating potential, and line conductors A, B and C.

The direct current circuit includes busses 30 and 32, to which the armature 14 of the direct current motor 12 is connected. The dual bridge converter 18 enables the magnitude of the direct current voltage applied to armature 14 to be adjusted by controlling the conduction or firing angle of the controlled rectifier devices, and it allows the direction of the direct current flow through the armature to be reversed when desired, by selectively operating the converter banks. When converter bank I is operational, current flow in the armature 14 is from bus 30 to bus 32, and when converter bank II is operational, the current flow is from bus 32 to bus 30.

The field winding 16 of drive motor 14 is connected to a source 34 of direct current voltage, represented by a battery in FIG. 1, but any suitable source, such as a single bridge converter, may be used.

The drive motor 12 includes a drive shaft indicated generally by broken line 36, to which a brake 37 and a traction sheave 38 are secured. An elevator car 40 is supported by ropes 42 which are reeved over the traction sheave 38, with the other ends of the ropes being connected to a counterweight 44. The elevator car is disposed in a hoistway 46 of a structure having a plurality of floors or landings, such as floor 47, which are served by the elevator car.

The movement mode of the elevator car 40 and its position in the hoistway 46 are controlled by a floor selector 48, which in turn selects the polarity of the voltage applied to the armature 14 of the drive motor 12. The magnitude of the direct current voltage applied to armature 14 is responsive to a velocity command signal VSP provided by suitable speed pattern generator 50.

The speed pattern generator 50 provides its speed pattern signal VSP in response to a signal from the floor selector 48. A suitable floor selector and a suitable speed pattern generator are shown in U.S. Pat. No. 3,750,850, which is assigned to the same assignee as the present application.

A servo control loop for controlling the speed, and thus the position of the elevator car 40 in response to the velocity command signal VSP includes a tachogenerator 52 which provides a signal TAC1 responsive to the actual speed of the elevator car. The speed pattern signal VSP is processed in a processing function 54 which is constructed according to the teachings of the invention, and the processed speed pattern VSP' is compared with the actual speed signal TAC1 from tachogenerator 52 in an error amplifier 56. The output signal RB of the error amplifier is compared with the actual current flowing in the operational converter bank via a current comparison circuit 60. Suitable compensation for the error signal is disclosed in U.S. Pat. No. 4,030,570, which is assigned to the same assignee as the present application.

The current comparison circuit 60, which is shown and described in detail in U.S. Pat. Nos. 3,713,011 and 3,713,012, which are assigned to the same assignee as the present application, also develops a signal responsive to the current flowing in the line conductors A, B and C of the operational converter bank, such as via current transformers 70, and it provides an error signal VC which has a magnitude and polarity responsive to any difference between the actual and desired currents.

The error signal VC is applied to a phase controller 80 which provides firing pulses FPI and FPII for converter banks 16 and 18, respectively. The firing pulses control the conduction angle of the controlled rectifier devices in response to the error signal VC. Bank reversal, and therefore selection of which converter should be operational is responsive to the switching signal $Q_0$. In order to maintain synchronism between the phase controller 80 and the converters, the conduction angle is maintained between predetermined limits or end stops, referred to as rectification and inversion end stops. A signal ESP is provided by the phase controller when the inversion end stop is reached, which is applied to the current comparison function 60. The current comparison function 60 also provides a signal BS which forces an end stop condition.

The phase controller 80 may be constructed according to the phase controller shown in the hereinbefore mentioned U.S. Pat. Nos. 3,713,011 and 3,713,012, or in my concurrently filed application Ser. No. 061,533, filed July 27, 1979, entitled "Converter Apparatus". The output of the phase controller 80 is applied to gate drivers 90, which in turn provide firing pulses FPI or firing pulses FPII, depending upon which bank is operational. Gate drivers 90 may be the same as shown in the hereinbefore mentioned U.S. Pat. Nos. 3,713,011 and 3,713,012, or as described in my concurrently filed application Ser. No. 061,532, filed July 27, 1979, entitled "Converter Apparatus".

Figure 2A:
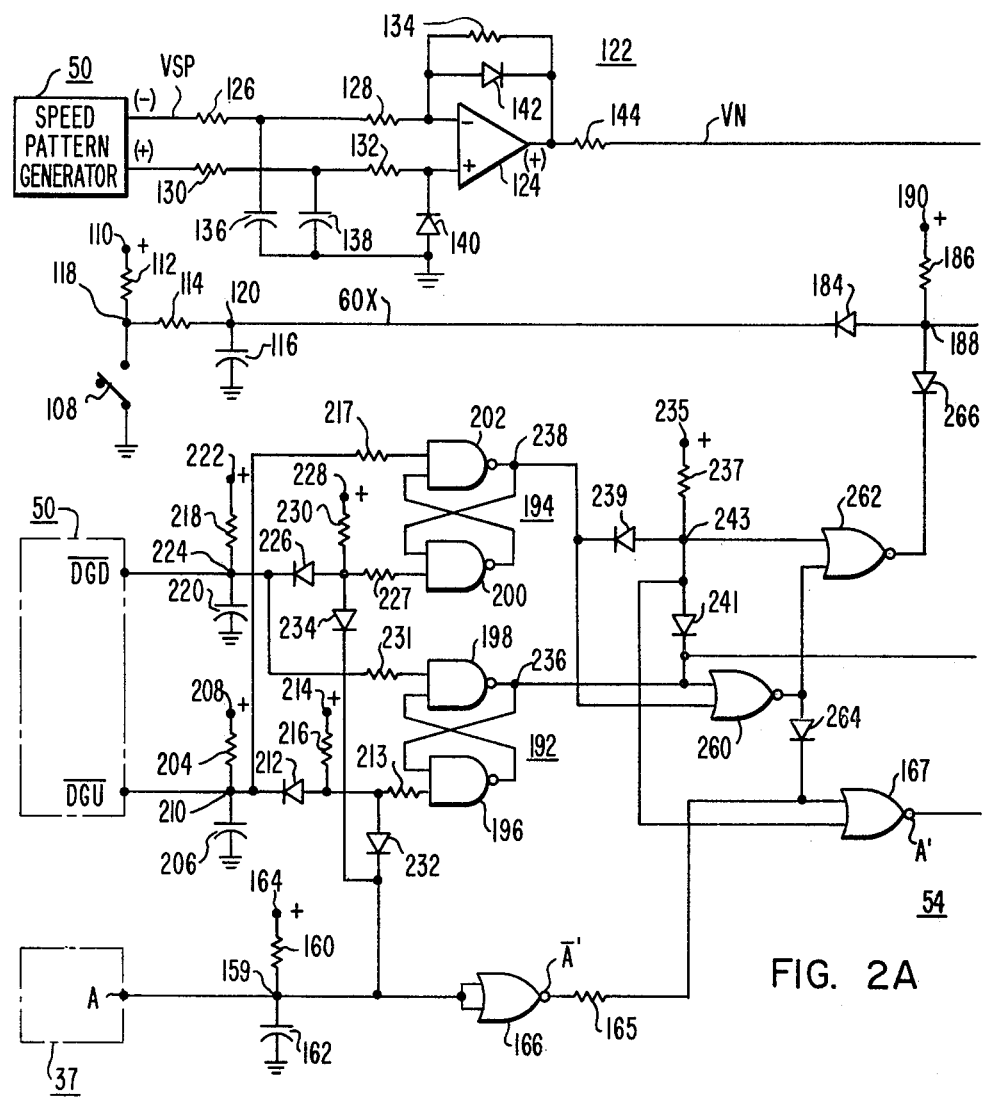
FIGS. 2A and 2B collectively set forth a schematic diagram of speed pattern processing logic constructed according to the teachings of the invention, which may be used for a function shown in block form in FIG. 1.
Figure 2B:
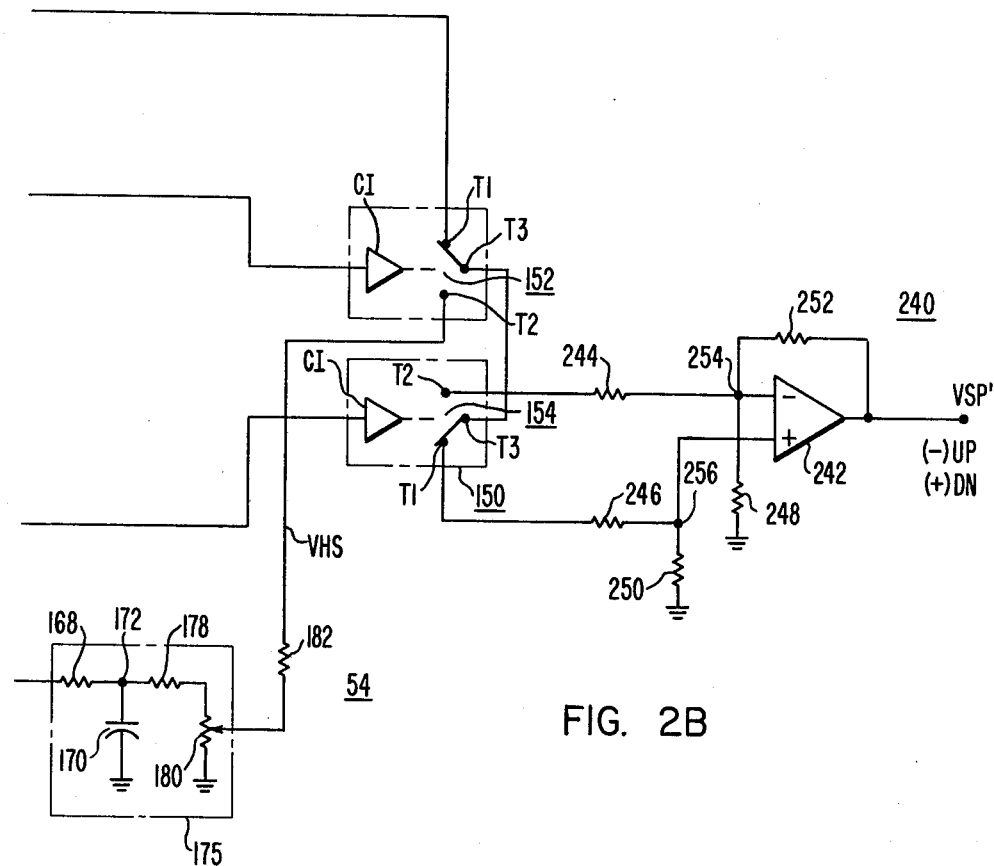

FIGS. 2A and 2B collectively set forth a schematic diagram of a speed pattern processing function 54 constructed according to the teachings of the invention, which may be used for the like referenced function shown in block form in FIG. 1. In accordance with the teachings of the invention, it is only necessary for the speed pattern generator 50 to provide a unidirectional speed pattern signal VSP, regardless of travel direction. As disclosed in the hereinbefore mentioned U.S. Pat. No. 3,750,850, floor selector 48 may cause the speed pattern generator to begin the process of providing a speed pattern signal in response to a signal $\overline{ACCX}$. In addition to a signal from the floor selector, the speed pattern generator 50 may also be responsive to a signal $\overline{A}$ from the brake circuit 37. For example, as shown in FIG. 1, brake circuit 37 may include a brake drum 92, a brake shoe 94 which is spring applied to the drum 92 to hold sheave 38 stationary, and a brake coil BK which lifts the brake shoe 94 when energized by a suitable command from floor selector 48. When the brake 37 is applied, i.e., set, a switch BK-1 is closed, and when the brake is lifted, switch BK-1 is opened. Suitable logic signals A and $\overline{A}$ may be provided responsive to the condition of switch BK-1 by connecting one side of switch BK-1 to a source 96 of unidirectional potential via a resistor 98, and its other side to ground. The junction 100 between switch BK-1 and resistor 98 is connected to provide an output signal A via a serial resistor 102 and a capacitor 104 which is connected from the output side of resistor 102 to ground. The complement of A, i.e., $\overline{A}$, is provided by an inverter gate 106. When switch BK-1 is closed, i.e., the brake is applied, logic signal A is zero and signal $\overline{A}$ is a logic one, and when the brake is lifted, signal A goes high and signal $\overline{A}$ goes low.

Speed pattern generator 50, in response to travel direction requests from the floor selector 48, also provides travel direction signals $\overline{DGU}$ and $\overline{DGD}$, as disclosed in the hereinbefore mentioned U.S. Pat. No. 3,750,850. Signals $\overline{DGU}$ and $\overline{DGD}$, when true (low), request the up and down travel directions, respectively. Finally, a speed mode logic signal 60X is provided, which when a logic one requests the normal speed mode and which when a logic zero requests the maintenance speed mode. Logic signal 60X may be provided by a switch 108, a source 110 of unidirectional potential, resistors 112 and 114, and a capacitor 116. Switch 108 connects source 110 to ground via resistor 112, with the junction 118 between resistor 112 and switch 108 being connected to ground via serially connected resistor 114 and capacitor 116. The junction 120 between resistor 114 and capacitor 116 provides logic signal 60X. Thus, when switch 108 is closed, logic signal 60X is low, selecting the low or maintenance speed mode, and when switch 108 is open, logic signal 60X is high, which selects the normal speed mode.

The present invention enables the normal speed pattern signal VSP provided by speed pattern generator 50 to be a unidirectional signal, regardless of the selected travel direction of the elevator car by the floor selector. It is related to logic ground and buffered via a differential buffer amplifier 122, which may include an operational amplifier (op amp) 124, resistors 126, 128, 130, 132 and 134, capacitors 136 and 138, and diodes 140 and 142. The negative lead of signal VSP is connected to the inverting input of op amp 124 via serially connected resistors 126 and 128, and the positive lead of signal VSP is connected to the non-inverting input of op amp 124 via serially connected resistors 130 and 132. The junction between resistors 126 and 128 is connected to logic ground via capacitor 136, and the junction between resistors 130 and 132 is connected to logic ground via capacitor 138. Resistor 134 is a feedback resistor connected from the output of op amp 124 to its inverting input. Diodes 140 and 142 limit the negative excursion of the output of op amp 124, with diode 140 having its cathode connected to the non-inverting input, and its anode to ground, and with diode 142 having its anode connected to the inverting input and its cathode to the output of op amp 124. The output of op amp 124 is connected to a switching arrangement 150 via a resistor 144.

Switching arrangement 150 includes first and second switching devices 152 and 154, respectively. Switching devices 152 and 154 are single pole, double throw analog switches, such as Analog Devices AD7512. Switches 152 and 154 each include first, second and third terminals T1, T2, and T3 respectively, and a control input terminal CI. The positions of switching devices 152 and 154 are controlled by logic signals applied to their control inputs CI, with a high or logic one control input signal interconnecting terminals T1 and T3, and with a logic zero signal interconnecting terminals T2 and T3. The output signal VN of op amp 124, representing the normal speed pattern signal VSP, is applied to terminal T1 of switching device 152, and it forms one of the two inputs to switching device 152. The other input, terminal T2 in this instance, receives a unidirectional speed pattern signal VHS, which directs the low or maintenance speed mode.

In a preferred embodiment of the invention, the speed pattern signal VHS is developed in response to a logic signal which changes logic state when the elevator car is to start a run. Further, this logic signal derived speed pattern signal is developed each time the elevator car starts, if a valid travel direction request exists, notwithstanding the selection of the normal speed pattern signal VN.

Figure 3:
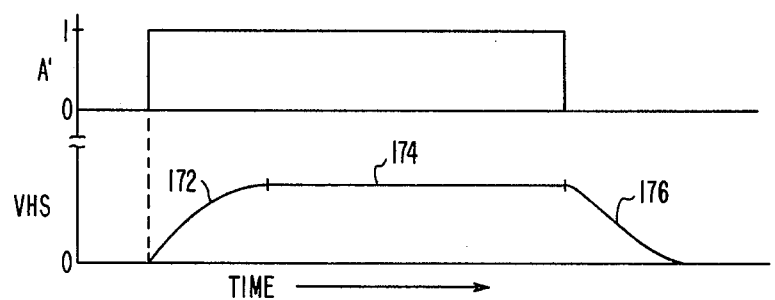
FIG. 3 is a graph illustrating the generation of a unidirectional speed pattern signal for the maintenance speed mode, from a logic signal.

For purposes of example, the brake signal A is used as the "start" signal, but it is to be understood that other logic signals associated with the starting of the elevator car may also be used as the "start" signal. Signal A goes from a logic zero to a logic one when the brake 37 is lifted. Signal A is applied to the junction 159 between the resistor 160 and a capacitor 162. The remaining end of resistor 160 is connected to a source 164 of unidirectional potential, and the remaining end of capacitor 162 is connected to ground. Signal A, which appears at junction 159, is inverted by a NOR gate 166 connected as an inverter to provide the complement A', and this signal is applied via a resistor 165 to an input of a NOR gate 167. NOR gate 167 will function as an inverter gate if its other input is enabled, i.e., low, providing an output A'. This other input will be low to enable NOR gate 167 to function as an inverter gate, as long as a valid travel direction request exists, i.e., one of the travel direction signals $\overline{DGU}$ and $\overline{DGD}$ is low and the other is high. Signal A' is applied to an RC circuit 175 which includes a resistors 168, 178 and 180, and a capacitor 170. The RC charging characteristic provides the acceleration portion of the speed pattern VHS. For example, FIG. 3 is a graph which illustrates the development of signal VHS from signal A'. Curve portion 172 represents the RC charging characteristic. The output of RC circuit 175 is applied to terminal T2 of switching device 152 via a resistor 182. The setting of adjustable resistor 180 determines the ultimate magnitude of the speed pattern signal VHS, represented by curve portion 174 in FIG. 3.

When the brake 37 is set to stop the car from the relatively low maintenance speed, the speed pattern is reduced exponentially and smoothly to zero via curve portion 176 in FIG. 3, which is determined by the discharge circuit of capacitor 170.

Thus, the two speed pattern signals VN and VHS are applied to terminals T1 and T2, respectively, of switching device 152. Thus, they function as input terminals and T3 is the output terminal of switching device 152. The control input CI of switching device 152 is controlled by the speed mode logic signal 60X. Signal 60X is connected to the control input CI of switching device 152 via a diode 184. A resistor 186 is connected from the junction 188 between the anode of diode 184 and the control input CI, to a source 190 of unidirectional potential. Thus, when signal 60X is high, requesting the normal speed mode, the signal applied to the control input CI of switching device 152 is a logic one and input T1 is connected to terminal T3, and thus the normal speed pattern signal VN appears at terminal T3. Alternatively, when signal 60X is low, selecting the maintenance speed mode, the signal applied to the control input CI of switching device 152 is a logic zero and terminal T2 is connected to terminal T3, and thus the maintenance speed pattern VHS appears at terminal T3.

In addition to selecting the desired speed mode, the switching arrangement 150 selects the polarity of the selected speed mode, and thus the travel direction, in response to the travel direction logic signals $\overline{DGU}$ and $\overline{DGD}$. The up and down travel direction signals $\overline{DGU}$ and $\overline{DGD}$ are used to set flip-flops 194 and 192, respectively. The selected travel direction at the time the elevator car is started is latched by the flip-flops 194 and 192, with the high or logic one signal A appearing at terminal 159 during the run enabling this latching function. Thus, signal A, going to a logic one, functions on every run to enable the travel direction latching function, and it also functions on every run to supply the signal from which the maintenance speed pattern signal VHS is developed. Between runs, signal A is low, and it disables the latching function.

Flip-flop 192 may be formed of cross coupled NAND gates 196 and 198, and flip-flop 194 may be formed of cross coupled NAND gates 200 and 202. A resistor 204 and a capacitor 206 are serially connected between a source 208 of unidirectional potential and ground, respectively, and the up travel direction signal $\overline{DGU}$ is connected to the junction 210 between resistor 204 and capacitor 206. Signal $\overline{DGU}$ is connected to an input of NAND gate 202 of flip-flop 194 via a resistor 217. Junction 210 is also connected to an input of NAND gate 196 of flip-flop 192 via a diode 212, and a resistor 213, with the cathode of diode 212 being connected to junction 210. The anode of diode 212 is connected to resistor 213, and also to a source 214 of undirectional potential via a resistor 216.

In like manner, a resistor 218 and a capacitor 220 are serially connected between a source 222 of unidirectional potential and ground, respectively, and the down travel directional signal $\overline{DGD}$ is connected to an input of NAND gate 198 of flip-flop 192 via a resistor 231. Signal $\overline{DGD}$ is also connected to the junction 224 between resistor 218 and capacitor 220. Junction 224 is connected to an input of NAND gate 200 of flip-flop 194 via a diode 226 and a resistor 227, with the cathode of diode 226 being connected to junction 224. The anode of diode 226 is connected to resistor 227, and also to a source 228 of unidirectional potential via a resistor 230.

Diodes 232 and 234 are connected from inputs of NAND gates 196 and 200, respectively, to junction 159 and thus to signal A, with their anodes being connected to the NAND gates and their cathodes connected in common to junction 159. Diodes 232 and 234 will hold the inputs of their associated NAND gates low, when signal A is low between runs, disabling the travel direction latching feature of flip-flops 192 and 194.

Output 236 of flip-flop 192 is connected to the control input CI of switching device 154. Terminal T3 of switching device 152 is connected to terminal T3 of switching device 154, and terminals T1 and T2 of switching device 154 function as outputs. Terminals T1 and T2 of switching device 154 are connected to an amplifier 240 which includes an op amp 242, and resistors 244, 246, 248, 250 and 252. Resistors 244 and 248 are serially connected from terminal T2 of switching device 154 to ground, and the junction 254 between them is connected to the inverting input of op amp 242. Resistors 246 and 250 are serially connected from terminal T1 of switching device 154 to ground, and the junction 256 between them is connected to the non-inverting input of op amp 242. Resistor 252 is a feedback resistor, connected from the output of op amp 242 to its inverting input. The output of op amp 242 provides the selected speed pattern, with the selected polarity, with this speed pattern signal being referenced VSP'. Thus, the logic level applied to the control input CI of switching device 154 controls the polarity of speed pattern signal VSP. When the up travel direction is selected signal $\overline{DGU}$ will be low and signal $\overline{DGD}$ will be high, outputs 236 and 238 of flip-flops 192 and 194 will be low and high, respectively, and a logic zero will be applied to control input CI of switching device 154. Terminal T3 will be connected to terminal T2 and the speed pattern will be applied to the inverting input of op amp 242. Thus, the speed pattern signal VSP' will be negative. When the down travel direction is selected, signal $\overline{DGD}$ will be low and signal $\overline{DGU}$ will be high, and a logic one will be applied to the control input CI. This connects terminal T3 to terminal T1, and the speed pattern is applied to the non-inverting input of op amp 242. Thus, the speed pattern signal VSP' will be positive.

A circuit which includes a source 235 of unidirectional potential, a resistor 237, dual input NOR gates 260 and 262 and diodes 239, 241, 264 and 266, monitors the outputs of flip-flops 192 and 194. For example, it will detect a malfunction in which both flip-flops 192 and 194 simultaneously provide true travel direction requests. It will also detect the lack of a true travel direction request when the start signal A goes true at the start of a run.

The cathode of diode 239 is connected to the output 238 of flip-flop 194, the cathode of diode 241 is connected to the output 236 of flip-flop 192, their anodes are connected together and this junction 243 is connected to source 235 via resistor 237, to an input of NOR gate 262, and to an input of NOR gate 167. Outputs 236 and 238 of flip-flops 192 and 194, respectively, are each connected to an input of NOR gate 260. The output of NOR gate 260 is connected to the remaining input of NOR gate 262, and also to the same input of NOR gate 167 as signal A' via diode 264. The output of NOR gate 262 is connected to junction 188 via diode 266. If the travel direction circuits are normal the output of NOR gate 262 will be high, enabling switch 108 to select either speed pattern, and the output of NOR gate 260 will be low, enabling the maintenance speed pattern VHS to build up and maintain its maximum signal.

In the operation of the speed pattern processing function 54, it will first be assumed that the elevator car is between runs, with no travel direction selection. Thus, start signal A will be low and travel direction signals $\overline{DGU}$ and $\overline{DGD}$ will both be high. This combination of signals resets both flip-flops 192 and 194, causing them to provide logic zero signals at their outputs 236 and 238, respectively. The output of NOR gate 166 will be high, and the output of NOR gate 167 low, which maintains the maintenance speed pattern VHS at zero magnitude. The output of NOR gate 260 will be high, causing the output of NOR gate 262 to be low. This selects the maintenance speed mode by applying a logic zero to switching device 152, regardless of the position of the speed mode selection switch 108.

If a true start signal is issued, i.e., signal A goes high, and the travel direction signals $\overline{DGU}$ and $\overline{DGD}$ are both high, i.e., no travel direction selection has been made by the floor selector 48, NOR gate 260 will detect this condition, providing a logic one output which prevents the outputs of NOR gates 167 and 262 from going high. Thus, NOR gate 262 forces the selection of the maintenance speed mode, and NOR gate 167 insures that the maintenance speed pattern signal VHS remains at zero magnitude.

If a valid travel direction selection exists when start signal A goes high, or a valid travel direction selection is made after start signal A goes high, one of the travel direction signals $\overline{DGU}$ and $\overline{DGD}$ will be low and the other high. This will switch the output of NOR gate 260 low, enabling NOR gate 167 to function as an inverter for signal $\overline{A}'$, providing a high signal A' at its output, which will start the maintenance speed pattern signal VHS as hereinbefore described relative to the graph in FIG. 3. Also, NOR gate 262 will now have two low inputs and its output will be high, enabling switch 108 to control the selection of the speed mode.

If the speed mode switch 108 is open, selecting the normal speed pattern mode, a logic one signal will be applied to the control input CI of switching device 152, interconnecting terminals T1 and T3. Thus, the normal speed pattern signal VN is selected. If the up travel direction is selected at the start of a run, signal $\overline{DGU}$ will go low and signal $\overline{DGD}$ will be high. Thus, output 236 of flip-flop 192 will be a logic zero, and output 238 of flip-flop 194 will be a logic one. A logic zero will be applied to the control input CI of switching device 154, selecting the normal speed pattern signal VN, which has a positive polarity, for application to the inverting input of op amp 242, providing a speed pattern signal VSP' having a negative polarity.

If the down travel direction had been selected, instead of the up travel direction, signal $\overline{DGD}$ will go low and signal $\overline{DGU}$ will be high, output 238 of flip-flop 194 will be low, and output 236 of flip-flop 192 will be high. Thus, switching device 154 will interconnect its terminals T3 and T1, applying the positive speed pattern signal VN to the non-inverting input of op amp 242, and the speed pattern signal VSP' will have a positive polarity.

If speed mode switch 108 is closed, selecting the maintenance speed mode, a logic zero signal will be applied to the control input CI of switching device 152, interconnecting terminals T3 and T2. Thus, the maintenance speed pattern signal VHS is selected. When the start signal is given by the floor selector 48 and signal A goes high, the output of NOR gate 167 will go high and the speed pattern signal VHS will be developed, as hereinbefore described relative to the graph of FIG. 3. The travel direction selection for the maintenance speed mode is made in the same manner as hereinbefore described relative to the travel direction selection for the normal speed pattern.

If for some reason the original travel direction signal should be lost, i.e., the low travel direction signal goes high, during a run of the elevator car, the original, travel direction selection will be unaltered, because the travel direction flip-flops will remain latched in their initial positions.

If at any time both flip-flops 192 and 194 should simultaneously request the up and down travel directions, i.e., outputs 236 and 238 are both at the logic one level, the maintenance speed pattern signal VHS will be selected, and if it is not already zero, its value will be smoothly reduced to zero and maintained at zero magnitude.

I claim as my invention:

1. An elevator system, comprising:
an elevator car,
a structure having spaced landings,
motive means for moving said elevator car relative to the structure to serve the landings,
travel direction means providing up and down travel direction signals when the elevator car is to travel in the up and down travel directions, respectively,
start means providing a start signal when the elevator car is to start a run,
mode means providing a mode signal which selects one of the first and second speed modes for said elevator car,
and speed pattern means providing a speed pattern reference signal for said elevator car which directs the movement thereof,
said speed pattern means including first and second means providing first and second unidirectional speed pattern signals for said first and second speed modes, respectively, and logic means responsive to said speed pattern means, said travel direction means, said start means, and said mode means, to provide a bi-directional speed pattern signal for said motive means responsive to the selected one of said first and second unidirectional speed pattern signals, with the polarity of the bi-directional speed pattern signal being responsive to said travel direction means,
said logic means including means causing the bidirectional speed pattern signal to exponentially decay to zero magnitude in response to the travel direction means simultaneously selecting both the up and down travel directions.

2. An elevator system, comprising:
an elevator car,
a structure having spaced landings,
motive means for moving said elevator car relative to the structure to serve the landings,
travel direction means providing up and down travel direction signals when the elevator car is to travel in the up and down travel directions, respectively,
start means providing a start signal when the elevator car is to start a run,
said start signal being a logic signal which changes from a first to a second logic level when the elevator car is to start,
mode means providing a mode signal which selects one of the first and second speed modes for said elevator car,
and speed pattern means providing a speed pattern reference signal for said elevator car which directs the movement thereof,
said speed pattern means including first and second means providing first and second unidirectional speed pattern signals for said first and second speed modes, respectively, and logic means responsive to said speed pattern means, said travel direction means, said start means, and said mode means, to provide a bi-directional speed pattern signal for said motive means responsive to the selected one of said first and second unidirectional speed pattern signals, with the polarity of the bi-directional speed pattern signal being responsive to said travel direction means, said second means providing the second unidirectional speed pattern signal in response to the second logic level of the start signal.

3. An elevator system, comprising:
an elevator car, a structure having spaced landings,
motive means for moving said elevator car relative to the structure to serve the landings,
travel direction means providing up and down travel direction signals when the elevator car is to travel in the up and down travel directions, respectively,
start means providing a start signal when the elevator car is to start a run,
mode means providing a mode signal which selects one of the first and second speed modes for said elevator car,
and speed pattern means providing a speed pattern reference signal for said elevator car which directs the movement thereof,
said speed pattern means including first and second means providing first and second unidirectional speed pattern signals for said first and second speed modes, respectively, and logic means responsive to said speed pattern means, said travel direction means, said start means, and said mode means, to provide a bi-directional speed pattern signal for said motive means responsive to the selected one of said first and second unidirectional speed pattern signals, with the polarity of the bi-directional speed pattern signal being responsive to said travel direction means,
said logic means including means enabled by the start signal to preserve the selected travel direction until the elevator car comes to a stop, notwithstanding a loss of the original travel direction signal during car movement.

4. An elevator system, comprising:
an elevator car,
a structure having spaced landings,
motive means for moving said elevator car relative to the structure to serve the landings,
travel direction means providing up and down travel direction signals when the elevator car is to travel in the up and down travel directions, respectively,
start means providing a start signal when the elevator car is to start a run, said
start signal being a logic signal which changes logic levels when the elevator car is to start,
mode means providing a mode signal which selects one of the first and second speed modes for said elevator car, and speed pattern means providing a speed pattern reference signal for said elevator car which directs the movement thereof, said speed pattern means including first and second means providing first and second unidirectional speed pattern signals for said first and second speed modes, respectively, and logic means responsive to said speed pattern means, said travel direction means, said start means, and said mode means, to provide a bi-directional speed pattern signal for said motive means responsive to the selected one of said first and second unidirectional speed pattern signals, with the polarity of the bi-directional speed pattern signal being responsive to said travel direction means, said logic means developing the second unidirectional speed pattern from said logic signal each time the car is to start, notwithstanding the selection of the first unidirectional speed pattern by the mode means.

5. An elevator system, comprising:

an elevator car, a structure having spaced landings, motive means for moving said elevator car relative to the structure to serve the landings, travel direction means providing up and down travel direction signals when the elevator car is to travel in the up and down travel directions, respectively, start means providing a start signal when the elevator car is to start a run, mode means providing a mode signal which selects one of the first and second speed modes for said elevator car, and speed pattern means providing a speed pattern reference signal for said elevator car which directs the movement thereof, said speed pattern means including first and second means providing first and second unidirectional speed pattern signals for said first and second speed modes, respectively, and logic means responsive to said speed pattern means, said travel direction means, said start means, and said mode means, to provide a bi-directional speed pattern signal for said motive means responsive to the selected one of said first and second unidirectional speed pattern signals, with the polarity of the bi-directional speed pattern signal being responsive to said travel direction means, said logic means including means selecting the second of the unidirectional speed pattern signals, and for exponentially reducing the second unidirectional speed pattern to zero, in response to the travel direction means simultaneously selecting both the up and down travel directions.

6. An elevator system, comprising:

an elevator car, a structure having spaced landings, motive means for moving said elevator car relative to the structure to serve the landings, travel direction means providing up and down travel direction signals when the elevator car is to travel in the up and down travel directions, respectively, start means providing a start signal when the elevator car is to start a run, mode means providing a mode signal which selects one of the first and second speed modes for said elevator car, and speed pattern means providing a speed pattern reference signal for said elevator car which directs the movement thereof, said speed pattern means including first and second means providing first and second unidirectional speed pattern signals for said first and second speed modes, respectively, and logic means responsive to said speed pattern means, said travel direction means, said start means, and said mode means, to provide a bi-directional speed pattern signal for said motive means responsive to the selected one of said first and second unidirectional speed pattern signals, with the polarity of the bi-directional speed pattern signal being responsive to said travel direction means, said logic means including memory means rendered effective by the start signal to retain the travel direction selected by the travel direction means, notwithstanding loss of the travel direction signal during the run.

7. An elevator system, comprising:

an elevator car, a structure having spaced landings, motive means for moving said elevator car relative to the structure to serve the landings, travel direction means providing up and down travel direction signals when the elevator car is to travel in the up and down travel directions, respectively, start means providing a start signal when the elevator car is to start a run, mode means providing a mode signal which selects one of the first and second speed modes for said elevator car, and speed pattern means providing a speed pattern reference signal for said elevator car which directs the movement thereof, said speed pattern means including first and second means providing first and second unidirectional speed pattern signals for said first and second speed modes, respectively, and logic means responsive to said speed pattern means, said travel direction means, said start means, and said mode means, to provide a bi-directional speed pattern signal for said motive means responsive to the selected one of said first and second unidirectional speed pattern signals, with the polarity of the bi-directional speed pattern signal being responsive to said travel direction means, said logic means including means selecting the second unidirectional speed pattern signal, and for maintaining it at zero magnitude, when the travel direction means has not provided a travel direction signal at the time the start means provides the start signal.

8. An elevator system, comprising:

an elevator car, a structure having spaced landings, motive means for moving said elevator car relative to the structure to serve the landings, travel direction means providing up and down travel direction signals when the elevator car is to travel in the up and down travel directions, respectively, start means providing a start signal when the elevator car is to start a run, mode means providing a mode signal which selects one of the first and second speed modes for said elevator car, id speed pattern means providing a speed pattern reference signal for said elevator car which directs the movement thereof, said speed pattern means including first and second means providing first and second unidirectional speed pattern signals for said first and second speed modes, respectively, and logic means responsive to said speed pattern means, said travel direction means, said start means, and said mode means, to provide a bi-directional speed pattern signal for said motive means responsive to the selected one of said first and second unidirectional speed pattern signals, with the polarity of the bi-directional speed pattern signal being responsive to said travel direction means, said logic means including means selecting the second unidirectional speed pattern signal in response to the travel direction means simultaneously providing the up and down travel direction signals, and means for reducing the second unidirectional speed pattern signal to zero, if not already at zero, at the time of the simultaneous selection of both travel directions.

* * * * *